US012344767B2

(12) United States Patent
Kling et al.

(10) Patent No.: US 12,344,767 B2
(45) Date of Patent: Jul. 1, 2025

(54) LOW EMISSIVE COATING COMPOSITIONS FOR CAMOUFLAGE, AND PRODUCTS THEREFROM

(71) Applicant: SAAB AB, Linköping (SE)

(72) Inventors: Daniel Kling, Västervik (SE); Ann-Sofie Olovsson, Gamleby (SE); Björn Boström, Angered (SE)

(73) Assignee: SAAB AB, Linköping (SE)

( * ) Notice: Subject to any disclaimer, the term of this patent is extended or adjusted under 35 U.S.C. 154(b) by 855 days.

(21) Appl. No.: 17/622,966

(22) PCT Filed: Jun. 28, 2019

(86) PCT No.: PCT/SE2019/050641
§ 371 (c)(1),
(2) Date: Dec. 27, 2021

(87) PCT Pub. No.: WO2020/263145
PCT Pub. Date: Dec. 30, 2020

(65) Prior Publication Data
US 2022/0267616 A1    Aug. 25, 2022

(51) Int. Cl.
*C09D 5/30*       (2006.01)
*C08K 7/22*       (2006.01)
*C08K 9/10*       (2006.01)
*C09D 7/40*       (2018.01)
*C09D 7/41*       (2018.01)
(Continued)

(52) U.S. Cl.
CPC .................. *C09D 5/30* (2013.01); *C08K 7/22* (2013.01); *C08K 9/10* (2013.01); *C09D 7/42* (2018.01); *C09D 7/61* (2018.01); *C09D 7/65* (2018.01); *C09D 7/70* (2018.01); *C08K 2003/0812* (2013.01); *C08K 2003/265* (2013.01)

(58) Field of Classification Search
CPC .............. C09D 5/30; C09D 7/42; C09D 7/61; C09D 7/65; C09D 7/70; C08K 7/22; C08K 9/10; C08K 2003/0812
See application file for complete search history.

(56) References Cited

U.S. PATENT DOCUMENTS

| | | | | |
|---|---|---|---|---|
| 5,607,995 A | * | 3/1997 | Wassermann | C09D 7/42 524/502 |
| 5,691,410 A | * | 11/1997 | Escarsega | C08G 18/10 524/591 |
| 6,468,647 B1 | * | 10/2002 | Sutter | H05K 9/0081 428/328 |

FOREIGN PATENT DOCUMENTS

| | | |
|---|---|---|
| DE | 4418215 A1 | 11/1995 |
| IL | 107878 A | 4/1999 |

OTHER PUBLICATIONS

International Search Report and Written Opinion mailed Jan. 28, 2020 for International Application No. PCT/SE2019/050641; 12 pages.
(Continued)

*Primary Examiner* — Bijan Ahvazi
(74) *Attorney, Agent, or Firm* — Sage Patent Group

(57) ABSTRACT

The present disclosure relates to a composition for providing a camouflage coating, the composition including an aqueous polyolefin binder dispersion; a low-emissive pigment; and a matting agent. The matting agent is a thermoplastic polymer matting agent. The disclosure further relates to a method of producing a low-emissive textile product using such a composition, as well as low-emissive textile products and camouflage products produced using the composition.

14 Claims, 2 Drawing Sheets

(51) Int. Cl.
      *C09D 7/42*     (2018.01)
      *C09D 7/61*     (2018.01)
      *C09D 7/65*     (2018.01)
      *C08K 3/08*     (2006.01)
      *C08K 3/26*     (2006.01)

(56)              References Cited

OTHER PUBLICATIONS

Extended European Search Report mailed Jan. 5, 2023 for European Patent Application No. 19935533.0, 10 pages.
Andersson, Kent et al.; "A Review of Materials for Spectral Design Coatings in Signature Management Applications"; Optics and Photonics for Counterterrorism, Crime Fighting, and Defence X, and Biomaterials in Security and Defence Systems Technology XI; Proceedings of International Society of Optics and Photonics (SPIE), vol. 9253; Oct. 31, 2014; 20 pages.

* cited by examiner

LOW EMISSIVE COATING COMPOSITIONS FOR CAMOUFLAGE, AND PRODUCTS THEREFROM

CROSS-REFERENCE TO RELATED APPLICATIONS

This application is a 35 U.S.C. § 371 national stage application for International Application No. PCT/SE2019/050641, entitled "LOW EMISSIVE COATING COMPOSITIONS FOR CAMOUFLAGE, AND PRODUCTS THEREFROM", filed on Jun. 28, 2019, the disclosures and contents of which are hereby incorporated by reference in their entireties.

TECHNICAL FIELD

The present invention relates to a low-emissive composition for coatings. The invention further relates to methods of coating substrates with such a composition, as well as camouflage products coated with such a composition.

BACKGROUND ART

The use of thermal imaging systems in military reconnaissance has increased significantly in recent years. Therefore, in order to avoid detection, there is a correspondingly increased requirement for effective camouflage against such systems.

Ideally, in order to prevent detection by thermal imaging systems, a camouflaged object should appear to have the same temperature as the background. One such means of avoiding detection is a camouflage net that utilizes convection-cooling mechanisms in order to improve heat transport to the surrounding atmosphere and thus remove heat from the camouflaged object.

An alternative means of preventing detection is by using a low-emissive camouflage material. Low-emissive materials act by reflecting heat radiation, thus making the camouflaged object appear cooler to the thermal detector. Israeli patent application no. IL 96565 A discloses compositions for application to surfaces which have to be camouflaged, and which provide a predetermined emissivity of about 0.4 to 0.9 in the 3 µm to 14 µm range.

There remains a need for improved means of providing effective thermal camouflage.

SUMMARY OF THE INVENTION

The inventors of the present invention have identified a number of shortcomings with prior art means of preventing detection by thermal imaging systems. Over and above avoiding thermal detection, it is desirable also to provide a camouflage that reduces the risk of visual detection. However, known low-emissive coatings utilize components that are visually easy to detect, such as pigments that reflect incident light and therefore sparkle or glint, or that have a glossy finish not in accord with a typical surrounding background. Conversely, camouflage coatings having a high emissivity may be more difficult to observe visually, but instead may be more easily detected by thermal imaging systems.

It is an object of the present invention to provide a means of overcoming or at least ameliorating some of the above-discussed shortcomings. In particular, it is desirable to provide a means of camouflaging an object that to a significant extent facilitates the avoidance of detection by both thermal and visual (e.g. ocular) detection systems.

These objects are achieved by a composition according to the appended independent claims.

The composition is for providing a low-emissive camouflage coating, and comprises a) an aqueous polyolefin binder dispersion; b) a low-emissive pigment; and c) a matting agent. The matting agent c) is selected from the group of matting agents that fulfil the following condition. When a test composition consisting of the matting agent and an aqueous polyolefin binder dispersion only is coated to an aluminium substrate to provide a test substrate, the resulting test substrate demonstrates an increase in average emissivity ($\varepsilon_{avg}$) in the wavelength intervals 3-5 µm and 8-12 µm that is less than 0.15 as compared to a reference substrate consisting of an aluminium substrate coated with the aqueous polyolefin binder dispersion only. The said test composition comprises matting agent in quantities sufficient to ensure that the test substrate has a gloss value of less than 2 when measured at both 60° and 85° in accordance with the method as defined in ISO 2813:2014.

Customarily, matting agents have not been used in conjunction with low-emissive camouflage coatings. This is possibly because many of the most widely utilized matting agents in coatings, such as silica, typically have a high absorption in the thermal range and therefore have a pronounced negative impact upon the low-emissive properties of the coating layer. It has been found that certain classes of matting agent are able to reduce the gloss of the coating composition without concomitant negative impact upon the low emissive properties of the coating. By utilizing a composition comprising a matting agent having a low absorption in the thermal spectral range, as in the present invention, the gloss (i.e. specular reflection) of an item treated with the composition is reduced, meaning that the item is more difficult to detect visually, assuming that the background is relatively non-reflective as is usually the case. At the same time, because the matting agent has a low absorption in the thermal spectral range, it does not detrimentally affect the low-emissive properties of the material as a whole.

A further advantage of the composition is that since it utilizes an aqueous binder system, it is more benign with regard to health and the environment as compared to traditional solvent-dispersed systems.

The permissible increase in average emissivity when identifying matting agents as described herein may be less than 0.1, such as less than 0.05.

The matting agent c) may be selected from thermoplastic polymer matting agents, such as hollow thermoplastic polymer microspheres or micronized polyolefin waxes. Alternatively, the matting agent c) may be selected from modified calcium carbonate matting agents, such as core/shell particles comprising a calcium carbonate core and hydroxyapatite shell. These classes of matting agents have been found to be capable of providing coatings with the desired combination of low gloss and low emissivity.

The matting agent c) may be an expanded hollow thermoplastic polymer microsphere, preferably having a D50 particle size of from about 20 to about 30 µm. Such matting agents are particularly well-suited for coating fabrics and other relatively uneven, flexible substrates.

By D50 particle size it is meant the particle diameter at which 50 wt % of the sample is comprised of smaller particles. This is also known as the mass median diameter.

Alternatively, or in addition, the matting agent c) may be a unexpanded hollow thermoplastic polymer microsphere, preferably having a D50 particle size of from about 10 to about 20 µm. Such matting agents may be expanded during drying and curing of the coating layer formed by the composition. Such matting agents are particularly well suited when coating smooth surfaces, such as the metal surfaces of vehicles in mobile camouflage, since they provide an exceptional reduction in the gloss of the final coated product.

The low-emissive pigment b) may be a metal powder or metal flake, such as an aluminium powder or aluminium flake. Metals, especially aluminium and silver, have excellent low-emissivity properties, and thus assist in aiding products coated using the composition to avoid thermal detection. Aluminium is preferred due to the lower cost as compared to silver.

The low-emissive pigment b) may be treated to reduce specular reflection in the visible spectral range. By the visible spectral range, it is meant the portion of the electromagnetic spectrum that is typically visible to the human eye. This is typically considered to be a frequency band encompassing wavelengths from about 380 nm to about 780 nm. Since low-emissive pigments typically have high reflectivity in the visual range, a treatment of the pigment may be desirable in order to reduce visual effects caused by specular reflection, e.g. sparkle, glint and gloss. This assists in reducing the risk for visual detection. The low-emissive pigment b) may for example be coated with a coating comprising a white pigment selected from the group consisting of titanium dioxide, barium sulfate, zinc oxide and zinc sulphide. Such coated low-emissive pigments have significantly reduced specular reflection, behaving essentially as white pigments in the visual spectral range, but maintain the excellent low-emissive properties of the underlying low-emissive pigment.

The composition may further comprise a coloured pigment having low absorption in the thermal spectral range. This allows the hue of the composition to be adapted to any desirable background colour without excessive negative impact upon the low-emissive properties of the composition.

The aqueous polyolefin binder dispersion a) may be a non-oxidised polyolefin dispersion, preferably a non-oxidized ethylene copolymer dispersion. Oxidised polyolefin dispersions tend to produce hard, non-flexible waxes that are unsuitable for use as binders in applications for coating fabrics. Non-oxidized ethylene copolymer dispersions on the other hand display may provide excellent flexibility and therefore are highly suitable for application in fabric coatings. The aqueous polyolefin binder dispersion a) may have a solids content of from about 30% to about 70% by dry weight.

According to another aspect of the invention, the objects of the invention are achieved by a method of producing a low-emissive textile product according to the appended independent claims.

The method comprises the steps of i) providing a textile substrate; and ii) treating the textile substrate with a composition as described herein.

Using such a method in combination with the compositions as described herein (and/or as defined in the appended claims) results in low-emissive textile products that may be used to facilitate avoidance of detection by both thermal and visual detection measures. Such a textile product may for example be a static camouflage such as a camouflage net, shelter or screen; or it may be a camouflaged garment such as a uniform, tactical suit or poncho.

According to a further aspect of the invention, the objects of the invention are achieved by a camouflage product, as defined in the appended claims.

The camouflage product comprises a low-emissive coating layer. The low-emissive coating layer comprises: a) a polyolefin binder; b) a low-emissive pigment; and c) a matting agent. The matting agent c) is selected from the group of matting agents identified as defined above. The matting agent may for example be any matting agent described in conjunction with the coating compositions described herein. Such a product has the advantages as described in association with the corresponding composition above.

The low-emissive coating layer may comprises
from about 40% to about 50% of the polyolefin binder a);
from about 10% to about 15% of the low-emissive pigment b); and
from about 0.5% to about 12% of the matting agent c).

All percentages are expressed in dry weight relative to the total dry weight of the coating layer. Such a composition of the coating layer provides products that have excellent low-emissivity properties, as well as being difficult to detect visually.

The coating layer may have a gloss value of less than 2 when measured at a measurement angle of 85° using the method of ISO 2813:2014. Alternatively, or in addition, the coating layer may have a gloss value of less than 2 when measured at a measurement angle of 60° using the method of ISO 2813:2014. The gloss value may for example be determined by applying the composition to a smooth, non-porous substrate, drying/curing to provide a coating layer, and measuring the gloss value of the coating layer using a gloss meter. Camouflage products having a gloss value of less than two typically are visually well-adapted to the surrounding background.

The camouflage product may be any type of camouflage product known in the art. It may be a static camouflage, such as a camouflage net, shelter or screen. Alternatively, it may be a mobile camouflage. Alternatively, it may be a camouflaged garment such as a uniform, tactical suit or poncho.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION

Figure 1:
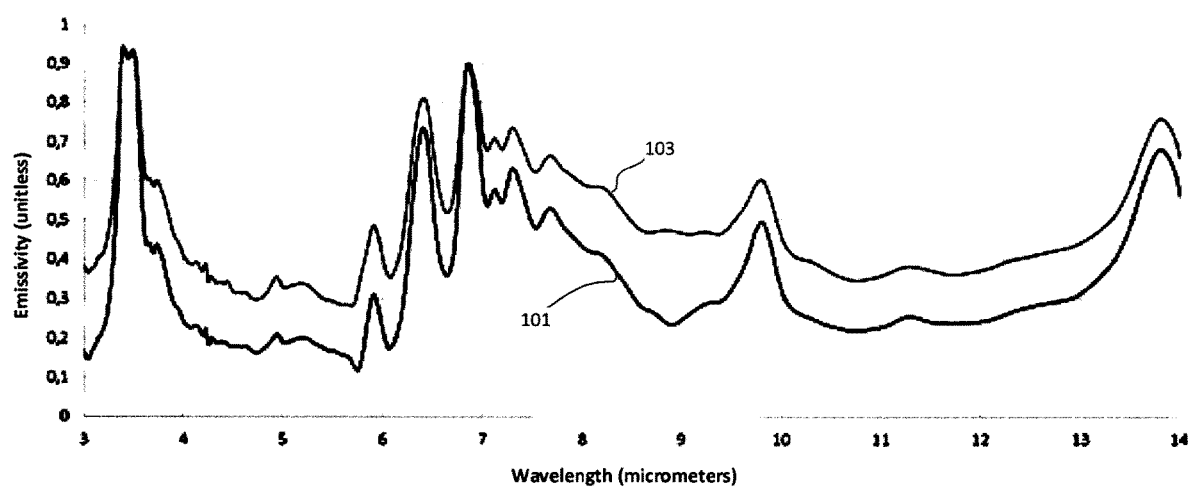
FIG. 1 illustrates the emissivity spectra of a reflective substrate coated with a coating comprising only binder or binder+matting agent.

The invention relates to means of providing camouflage that may assist in avoiding both thermal and visual detection. The invention may be applicable to a wide range of products, including but not limited to camouflage net, uniforms and screens.

The invention aims to reduce the thermal signature of an item by utilizing a coating composition that can be used to provide a low-emissive coating layer to the item to be camouflaged. At the same time, the compositions are formulated to ensuring that the low-emissive coating does not detrimentally affect the visual signature of the item. By low-emissive it is meant that incident radiation in the medium-wave (3-5 µm; MWIR) and long-wave (8-12 µm; LWIR) infrared spectral ranges is reflected to a significant extent, rather than absorbed. This assists in masking the thermal signature of the camouflaged item. For example, a surface coated with the low-emissive coating may have a hemispherical emissivity E of less than 0.7 (using the approximation that the coated surface is thermally opaque). The hemispherical emissivity E may be determined from the thermal reflectance spectra of the coated surface using methods and means known in the art, e.g. using a FTIR spectrophotometer equipped with a gold-coated integration sphere.

The composition according to the invention comprises a) an aqueous polyolefin binder dispersion; b) a low-emissive pigment; and c) a matting agent. Each of these components will now be discussed in turn.

a) Aqueous Polyolefin Binder Dispersion

For application in low-emissive coatings it is important that the binder used does not itself absorb thermal radiation to a significant extent. For example, a highly reflective substrate coated with a thin coating of binder only should preferably have an overall hemispherical emissivity of no greater than 0.4 in the MWIR and LWIR ranges. Polyolefins are relatively transparent in the thermal range and therefore are well suited to the purpose. The binder is a water-dispersed system, which is advantageous from both a health and environmental viewpoint, as compared to traditional solvent-based binder systems. The binder is preferably a non-oxidized polyethylene copolymer, as such binders have been found to possess the flexibility required for textile coating applications. Suitable binders are for example commercially available under the Aquaseal brand from Paramelt Veendam B. V or under the Hypod brand from Dow Chemical Company.

The aqueous polyolefin binder dispersion may have a solids content of from about 30% to about 70% by dry weight, preferably about 50% by dry weight.

b) Low-Emissive Pigment

The low-emissive pigment, also known as IR-reflecting pigment, is the component that is used to ensure that a significant proportion of incident radiation is reflected from the coating layer instead of absorbed. Metal pigments, such as aluminium or silver powders or flakes, are known to be excellent low-emissive pigments. However, the untreated metals tend also to cause specular reflection in the visible spectral range, leading to effects such as glint, sparkle and/or gloss that make the coatings easier to observe visually upon incident light. Therefore, it is preferred that the low-emissive pigment is treated in order to reduce specular reflection in the visible spectral range, without excessive deterioration of the low-emissive properties of the pigment. This may for example be done by coating the low-emissive pigment with a coating comprising a white pigment, such as a white pigment selected from the group consisting of titanium dioxide, barium sulfate, zinc oxide and zinc sulphide. Such coated low-emissive pigments are described in US patent application 2015/0247040, and the pigments described therein are specifically incorporated by reference as suitable for use in the present invention. Suitable pigments are commercially available under the IReflex brand from Eckart GmbH.

c) Matting Agent

The matting agent is used to reduce the gloss of the coating layer such that it is well adapted to the gloss of the surrounding environment. This may be achieved by ensuring that the coating layer has a gloss value of less than 2 when measured at a measurement angle of 85° using the method of ISO 2813:2014. For reference, a corresponding coating layer but lacking the matting agent typically has a gloss value in excess of 25 when measured under the same conditions.

However, it is also important that the matting agent itself does not significantly interfere with or degrade the low-emissive properties of the coating layer. Typical matting agents for coatings, such as silica, absorb highly in the IR spectral range and thus are unsuitable for application in low-emissive coatings for camouflage. It is preferable that the matting agent when added to the binder in suitable quantities provides a thin coating layer that has an overall hemispherical emissivity not in excess of 0.5 in the MWIR and LWIR ranges.

In order to identify a suitable matting agent, a test composition consisting only of matting agent and aqueous polyolefin binder dispersion (e.g. Aquaseal X2200) may be applied to an aluminium substrate. The test composition comprises matting agent in sufficient quantities to ensure that the coated aluminium substrate produced by coating the aluminium substrate with the test substrate has a gloss value of than 2 when measured at both 60° and 85° in accordance with the method as defined in ISO 2813:2014. The average emissivity in the wavelength intervals 3-5 µm and 8-12 µm is then determined for this coated test substrate. The determined average emissivity is compared to a reference substrate coated only with the same aqueous polyolefin binder dispersion (e.g. Aquaseal X2200); i.e. not comprising matting agent. This allows the effect of the matting agent on the emissivity properties of the coating system to be determined. If the increase in average emissivity (€) in the wavelength intervals 3-5 µm and 8-12 µm is determined to be than 0.15, then the test matting agent is suitable for use in compositions according to the invention. Preferably, the increase in average emissivity is much more modest, such as an increase in emissivity of less than 0.1, or an increase in emissivity of less than 0.05.

It has been found that hollow thermoplastic polymer microspheres fulfil the requirements above. They have an excellent ability to reduce the gloss of a low-emissive coating layer without negatively affecting the low-emissive properties of the layer. Hollow polymer microspheres typically comprise a thermoplastic polymer shell filled with a hydrocarbon propellant. Upon heating, the shell softens and the propellant is converted to the gas phase, thus exerting an internal pressure on the shell and causing the softened shell to expand. Different grades of hollow thermoplastic polymer microsphere have different expansion temperatures and properties, which may be tailored by judicious choice of thermoplastic polymer and propellant. The hollow thermoplastic polymer microsphere matting agent may be incorporated into the coating composition in an already expanded form, or it may be incorporated unexpanded, for expansion in conjunction with drying/curing of the coating layer. The matting agent may be added in dry form to the binder dispersion, or it may be added wet or as an aqueous slurry. Already expanded hollow thermoplastic polymer microspheres may preferably have a D50 particle size of from about 20 to about 30 µm, whereas unexpanded hollow thermoplastic polymer microspheres may preferably have a D50 particle size of from about 10 to about 20 µm. Suitable hollow polymer microspheres are for example commercially available under the Expancel brand from Nouryon, in a variety of expanded, unexpanded, dry, wet and slurry grades. Expanded hollow thermoplastic polymer microsphere matting agent is particularly suitable for use in compositions for coating fabrics. Unexpanded hollow thermoplastic polymer microsphere matting agent is particularly suitable for coating of smooth surfaces such as in mobile camouflage applications, since it allows the use of high matting agent loadings in the coating composition, which may be required in order to achieved a suitable gloss in such applications.

Depending on the application, other polyolefin thermoplastic polymer matting agents may provide suitable matting without excessive deterioration of the low-emissive properties of the coating. For example, micronized polyolefin (polyethylene or polypropylene) particles may be used, either as a powder or as an aqueous dispersion. Such products are for example commercially available under the Ceraflour and Aquamat brands from BYK.

Further classes of matting agents that may be suitable for use include modified calcium carbonate matting agents. Suitable modified calcium carbonate matting agents include core/shell particles having a calcium carbonate core and a hydroxyapatite shell, commercially available as Omyamatt 100 from Omya International AG. These matting agents may have a D98 particle size of approximately 60 µm.

Further Components

The composition may comprise further substances as applicable and known in the art. For example, the composition may comprise flame retardants, stabilizers, further pigments, wetting agents, defoamers, fungicides, curing agents, hardeners, or rheology modifying agents such as thickeners.

In order to more closely resemble the prevailing colours of the surrounding environment, the composition may further comprise one or more coloured pigments. Such pigments should be chosen to have as low absorption as possible in the medium-wave (3-5 µm) and long-wave (8-12 µm) infrared electromagnetic spectral ranges, so as to not excessively degrade the low-emissive properties of the coating. Most pigments absorb in the thermal region to some degree. Organic pigments tend to have well-defined absorption peaks, whereas metal-based pigments tend to absorb at a lower level across a broader spectral range. Therefore, depending on the application and the desired colour saturation to be achieved, most pigments are acceptable for use in low emissive coatings. However, titanium dioxide and carbon black should be avoided.

Composition

The composition is manufactured by dispersing the matting agent and low-emissive pigment, together with any further components, in the aqueous polyolefin binder dispersion using means and methods well known in the art. Depending on the concentration of the components used and the final properties of the composition desired, the composition may require further dilution by water or aqueous solution.

The relative ratios of the components of the composition depend on the desired dry ratio to be obtained in the final coating layer as well as in the form (dry, aqueous slurry or dispersion) that each component is added. A suitable composition of the final coating layer may be as follows, where the percentages are expressed as dry weight relative to the total dry weight of the coating layer. Note however that these examples are provided for guidance only, and compositions not conforming to the given proportions may also provide satisfactory low-emissive coatings.

From about 40% to about 50% of the polyolefin binder a);
From about 10% to about 15% of the low-emissive pigment b); and
From about 0.5% to about 12% of the matting agent c).

For example, a coating layer for a static camouflage may have the following composition:
From about 40% to about 45% of the polyolefin binder a);
From about 10% to about 15% of the low-emissive pigment b); and
From about 0.5% to about 1% of the matting agent c).

Alternatively, a coating layer for a mobile camouflage may have the following composition:
From about 45% to about 50% of the polyolefin binder a);
From about 10% to about 15% of the low-emissive pigment b); and
From about 8% to about 12% of the matting agent c).

Further components as described above, for example coloured pigment and/or flame retardant, may comprise the balance of the composition.

Coating

The method of producing a product comprises the steps of providing a substrate and treating the substrate with the composition as described herein. Depending on the substrate used, the treatment will entail impregnation or coating the surface of the substrate. The composition is applied to the item to be coated using any coating means known in the art, including roller coating, spray coating and printing. The composition is well suited for the impregnation or coating of textile substrates, but may also be applied to other substrates such as metal or polymer sheets.

The coating layer may preferably be as thin and light as possible, while maintaining good signature management properties. For example, the coating layer may have a thickness of from about 10 µm to about 100 µm, preferably from about 15 µm to about less than 30 µm. The thickness of a coating layer may be estimated from the area coated and the coating weight, provided that the specific density of the coating is known. Alternatively, the thickness of a dry coating layer may be determined using for example the methods of ISO standard ISO 2808:2007 "Paints and varnishes—determination of film thickness".

Camouflage Product

The composition may be used to provide thermal signature management in any camouflage product known in the art. For example a camouflage product may be a static camouflage such as a camouflage net, shelter (e.g. tent) or screen, a mobile camouflage (e.g. for vehicles), or a camouflage garment (such as for example a uniform, tactical suit or poncho).

The invention will now be described in more detail with reference to certain exemplifying embodiments and the drawings. However, the invention is not limited to the exemplifying embodiments discussed herein and/or shown in the drawings, but may be varied within the scope of the appended claims. Furthermore, the drawings shall not be considered drawn to scale as some features may be exaggerated in order to more clearly illustrate certain features.

EXAMPLES

IR-Transparency Properties of Binder and Matting Agent.

A reference binder coating sample was prepared by applying a polyethylene copolymer binder dispersion (Aquaseal X2200) as a thin film to an aluminium sheet substrate using a wire bar coater. After drying, the final film thickness was approximately 22 µm. A binder+matting agent coating sample, incorporating c:a 1 wt % of matting agent (relative to dry weight of binder; matting agent is Expancel 462WE20), was prepared by dispersing the matting agent in the binder and coating in a corresponding manner.

The thermal reflectance spectra of the coated aluminium samples were obtained on a Bruker FTIR spectrometer equipped with a gold-coated integration sphere. The hemispherical emissivity ε of the samples was calculated from the thermal reflectance R using the approximation ε=1−R (which holds for samples having negligible transmissivity). FIG. 1 shows the calculated hemispherical emissivity spectra of the coated samples. Line 101 shows the binder only sample and line 103 shows the binder+matting agent sample. The uncoated aluminium substrate has a uniformly low emissivity (high reflectance), so the emissivity of the coated substrates can be seen as a measure of the transparency of the coating layer. It can be seen that the sample coated with binder in itself has an overall emissivity of approximately 0.4 in the medium-wave (3-5 μm) and long-wave (8-12 μm) IR spectral regions, i.e. the sample retains a low emissivity (high reflectance) due to good transparency of the binder layer. Adding matting agent to the binder results in a slight increase in the emissivity of the coated sample (i.e. slightly reduced transparency of the coating layer), but the result is an overall emissivity that is still acceptably low.

Identification of Suitable Matting Agents

In order to test matting agents in order to identify whether they are suitable for use in conjunction with the present invention, test compositions comprising matting agent blended in aqueous polyethylene binder (Aquaseal X2200) were prepared. Matting agent was included in each test composition in quantities sufficient to ensure that the resulting coated substrate has a gloss value of less than 2 as measured at 60° and 85° by the method of ISO 2813:2014.

Each test composition was coated to an aluminium sheet substrate and the hemispherical emissivity determined as described above. An average value of the hemispherical emissivity E in the 3-5 μm and 8-12 μm regions respectively was then determined for each coated substrate. These two averages were in turn averaged as $\varepsilon_{avg}=(\varepsilon_{3-5}+\varepsilon_{8-12})/2$ in order to provide a single average emissivity $\varepsilon_{avg}$ for the relevant spectral regions. This average emissivity was then compared to the emissivity determined in the same manner for the reference substrate coated with binder only. The results are shown in the Table below.

| Test substrate | ε (3-5 μm) | ε (8-12 μm) | $\varepsilon_{avg}$ | $\varepsilon_{avg}-\varepsilon_{ref}$ |
|---|---|---|---|---|
| Aluminium substrate | 0.086 | 0.08 | | |
| Aquaseal X2200 (Reference) | 0.392 | 0.388 | 0.39 | |
| Syloid W900 (comparative example of a silica-based matting agent) | 0.439 | 0.647 | 0.543 | 0.153 |
| Expancel 820SLU | 0.372 | 0.386 | 0.379 | −0.011 |
| Expancel 461 WE20 | 0.41 | 0.358 | 0.384 | −0.006 |
| Omyamatt 100 | 0.404 | 0.393 | 0.399 | 0.009 |

It can be seen that the reference substrate coated with binder only has an average emissivity of 0.39. Using matting agents as identified in the present disclosure, the average emissivity is very nearly unchanged by addition of the matting agent. However, using a traditional silica-based matting agent (Syloid W900) that absorbs in the IR region, the average emissivity is greatly increased to 0.543, an increase of 0.153. Thus it is seen that silica-based matting agents are unsuitable for use in conjunction with the present invention, whereas the Expancel polymer microspheres and Omyamatt modified calcium carbonate are suitable for use.

Camouflage Compositions

A suitable composition for use in static camouflage applications is as follows:

| Component | Name | Amount (wt %) |
|---|---|---|
| Binder | Aquaseal X2200 | 40-45 |
| LE-pigment | IReflex | 10-15 |
| Matting agent | Expancel 462WE20 | 0.5-1 |

The pigment and matting agent are dispersed in the binder and the composition is applied to a suitable substrate, such as a camouflage net. The composition may suitably comprise further components as known in the art, such as coloured pigments, stabilizers and flame retardants.

A suitable composition for use in mobile camouflage applications is as follows:

| Component | Name | Amount (wt %) |
|---|---|---|
| Binder | Aquaseal X2050 | 45-50 |
| LE-pigment | IReflex | 10-15 |
| Matting agent | Expancel 820 SLU40 | 8-12 |

The pigment and matting agent are dispersed in the binder and the composition is applied to a suitable substrate, such as a vehicle body. The composition may comprise further components as known in the art, such as coloured pigments, stabilizers and flame retardants. Upon drying/curing at elevated temperature, the matting agent expands, providing an extremely low-gloss finish to the coatings.

The final coated surfaces have gloss values of less than 2 when measured at an angle of 85° using the method of ISO 2813:2014, and preferably also a gloss value of less than 2 when measured at 60°. For comparison, a coating lacking matting agent has a corresponding gloss value of greater than 25.

Figure 2:
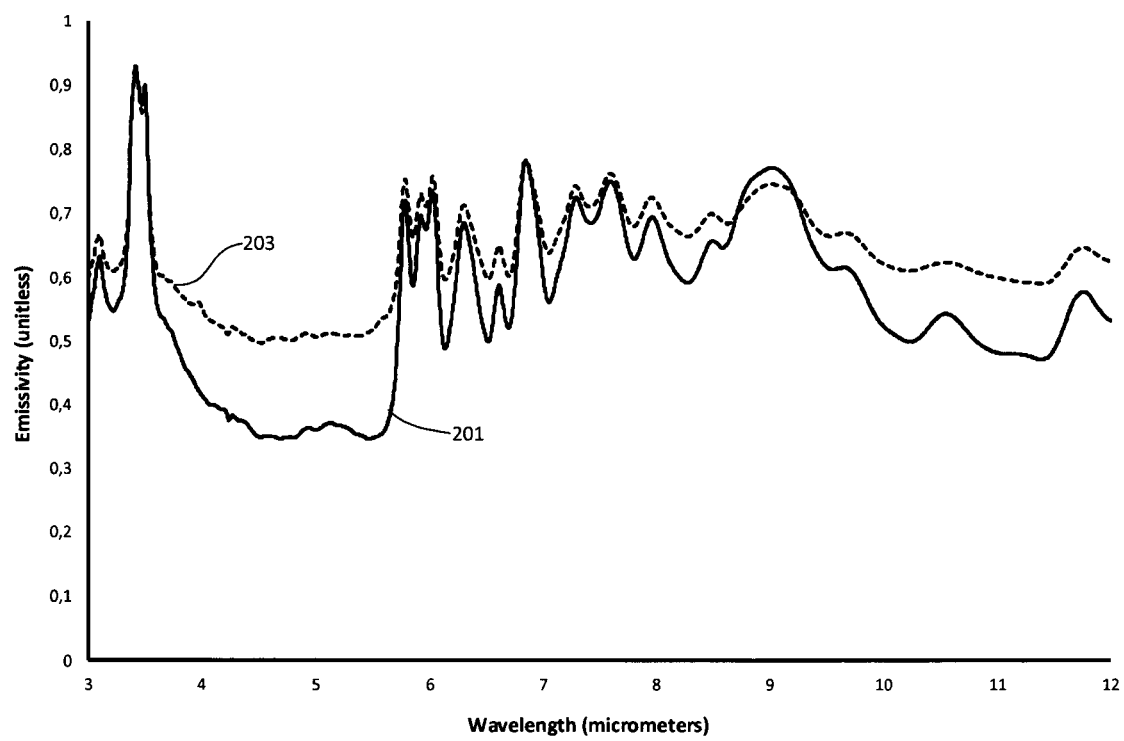
FIG. 2 illustrates the emissivity spectra of substrates coated with a camouflage coating composition.

A camouflage composition for use in static camouflage applications was coated onto a substrate using a wire bar coater as described above. The camouflage composition was formulated in accordance with compositions for use in static camouflage applications as detailed above, and further comprised green-coloured pigment. The substrates used were a thermal IR-reflective aluminium sheet as in the previous experiments, and a TIR-opaque substrate. The thermal reflectivity spectra of the coated substrates were obtained on an FTIR spectrometer as described above, and the emissivity of the coated substrates was calculated. FIG. 2 shows the calculated hemispherical emissivity spectra of the substrates coated with camouflage composition. Line 201 shows the emissivity spectrum of the coated TIR-reflective (aluminium sheet) substrate, and line 203 shows the emissivity spectrum of the coated TIR-opaque substrate.

It can be seen that the camouflage composition-coated samples have low average emissivity in the 3-5 μm wavelength range and in the 8-12 μm wavelength range. Comparing the emissivity profile of these samples (FIG. 2) to the sample coated only with binder+matting agent (FIG. 1 line 103), it can be seen that the camouflage composition comprising a low-emissive pigment provides a more uniform emissivity profile, where the emissivity peaks are lower and the troughs are higher as compared to the binder+matting agent reference.

Comparing the coated TIR-reflective substrate (line 201) with the coated TIR-opaque substrate (line 203) it can be seen that the emissivity spectra of these samples are very similar, with the coated TIR-opaque sample showing only a slightly higher emissivity in regions where the binder+matting agent are exceptionally IR-transparent (e.g. at a wavelength of 5 µm). This demonstrates that the low emissivity properties of the coated substrates are due to the low-emissive camouflage composition and not merely due to the use of an IR-reflective substrate.

In summary, the camouflage compositions according to the present invention may be used to provide camouflaged articles having low emissivity and low gloss.

The invention claimed is:

1. A composition comprising:
 a non-oxidized polyolefin binder dispersion;
 a low-emissive pigment comprising a metal powder or metal flake; and
 a matting agent;
 wherein the matting agent is selected from the group consisting of hollow thermoplastic polymer microspheres, micronized polyolefin waxes, and calcium carbonate core and hydroxyapatite shell, wherein the matting agents defined in that when a test composition consisting of the matting agent and the non-oxidized polyolefin binder dispersion only is coated to an aluminium substrate to provide a test substrate, the resulting test substrate demonstrates an increase in average emissivity (Eavg) in the wavelength intervals 3-5 µm and 8-12 µm that is less than 0.15 as compared to a reference substrate consisting of an aluminium substrate coated with the on-oxidized polyolefin binder dispersion only;
 wherein the said test composition comprises matting agent in quantities sufficient to ensure that the test substrate has a gloss value of less than 2 when measured at both 60° and 85° in accordance with the method as defined in ISO 2813:2014.

2. The composition according to claim 1, wherein the matting agent is an expanded hollow thermoplastic polymer microsphere having a D50 particle size of from about 20 to about 30 µm.

3. The composition according to claim 1, wherein the matting agent is an unexpanded hollow thermoplastic polymer microsphere-having a D50 particle size of from about 10 to about 20 µm.

4. The composition according to claim 1, wherein the low-emissive pigment is an aluminium powder or aluminium flake.

5. The composition according to claim 1, wherein the low-emissive pigment is treated to reduce specular reflection in the visible spectral range.

6. The composition according to claim 5, wherein the low-emissive pigment is coated with a coating comprising a white pigment selected from the group consisting of titanium dioxide, barium sulfate, zinc oxide and zinc sulphide.

7. The composition according to claim 1, further comprising a coloured pigment having low absorption in the thermal spectral range.

8. The composition according to claim 1, wherein the non-oxidized polyolefin dispersion is a non-oxidized ethylene copolymer dispersion.

9. A method of producing a low-emissive textile product, the method comprising the steps of:
 i) providing a textile substrate; and
 ii) treating the textile substrate with a composition according to claim 1.

10. The low-emissive textile product, produced by a method according to claim 9, wherein the low-emissive textile product is a camouflage net, shelter or screen; or wherein the low-emissive textile product is a camouflaged garment.

11. A camouflage product comprising a low-emissive coating layer, the low-emissive coating layer comprising:
 a non-oxidized polyolefin binder dispersion;
 a low-emissive pigment comprising a metal powder or metal flake; and
 a matting agent;
 wherein the matting agent is selected from the group consisting of hollow thermoplastic polymer microspheres, micronized polyolefin waxes, and calcium carbonate core and hydroxyapatite shell, wherein the matting agents defined in that when a test composition consisting of the matting agent and the non-oxidized polyolefin binder dispersion only is coated to an aluminium substrate to provide a test substrate, the resulting test substrate demonstrates an increase in average emissivity (Eavg) in the wavelength intervals 3-5 µm and 8-12 µm that is less than 0.15 as compared to a reference substrate consisting of an aluminium substrate coated with the on-oxidized polyolefin binder dispersion only;
 wherein the said test composition comprises matting agent in quantities sufficient to ensure that the test substrate has a gloss value of less than 2 when measured at both 60° and 85° in accordance with the method as defined in ISO 2813:2014.

12. The camouflage product according to claim 11, wherein the low emissive coating layer comprises about 40% to about 50% of the non-oxidized polyolefin binder; about 10% to about 15% of the low-emissive pigment; and about 0.5% to about 12% of the matting agent, wherein all percentages are expressed in dry weight relative to the total dry weight of the coating layer.

13. The camouflage product according to claim 11, wherein the coating layer has a gloss value of less than 2 when measured at a measurement angle of 85° using the method of ISO 2813:2014.

14. The camouflage product according to claim 11, wherein the camouflage product is a camouflage net, shelter or screen; or wherein the camouflage product is a mobile camouflage; or a camouflaged garment.

* * * * *